Figure 1:
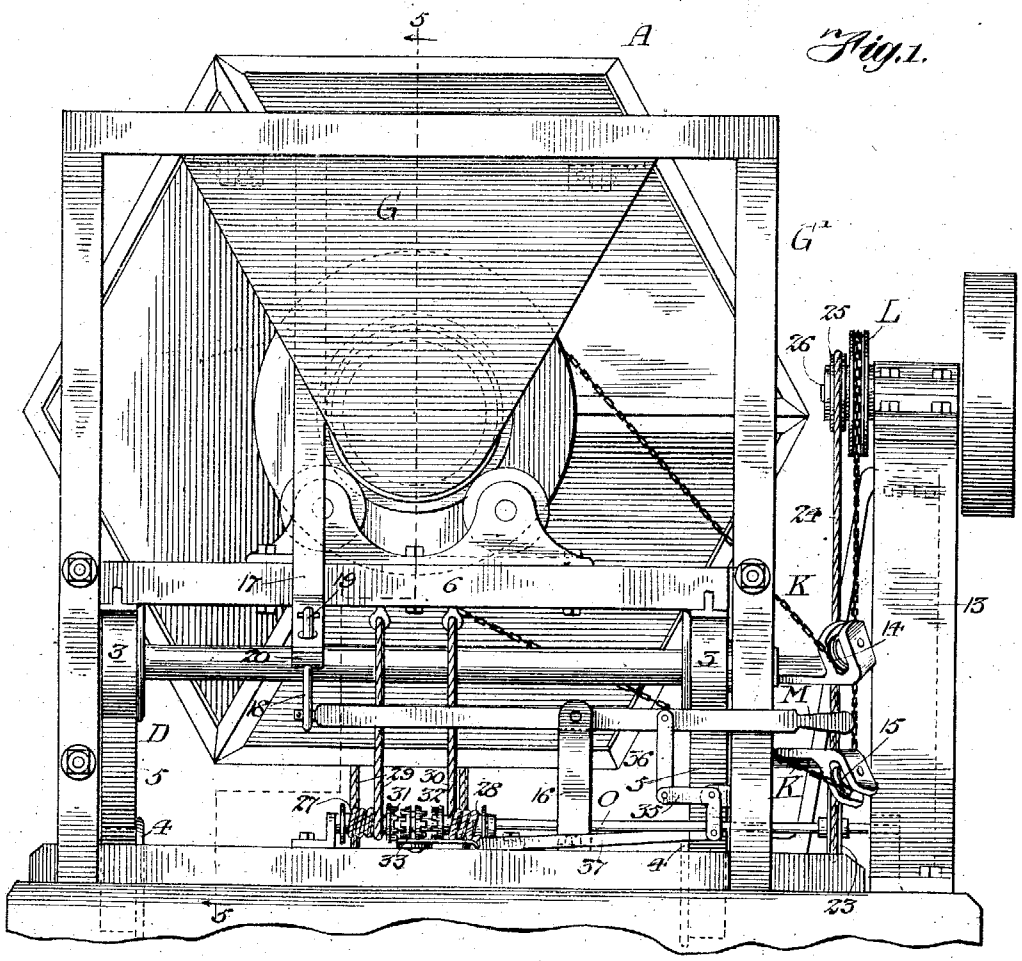

No. 12,309. REISSUED JAN. 31, 1905.

W. J. JUDD.

MACHINE FOR MIXING CONCRETE OR THE LIKE.

APPLICATION FILED MAR. 11, 1903.

8 SHEETS—SHEET 1.

Witnesses.
Louis H. T. Whitehead
Ottilie C. Freiberg

Inventor
William J. Judd
by Chas. G. Page
Atty.

No. 12,309. REISSUED JAN. 31, 1905.

W. J. JUDD.

MACHINE FOR MIXING CONCRETE OR THE LIKE.

APPLICATION FILED MAR. 11, 1903.

8 SHEETS—SHEET 2.

Witnesses:
Louis M. T. Whitehead
Ottilie C. Freiberg

Inventor:
William J. Judd
by Chas. G. Page
atty.

No. 12,309. REISSUED JAN. 31, 1905.

W. J. JUDD.

MACHINE FOR MIXING CONCRETE OR THE LIKE.

APPLICATION FILED MAR. 11, 1903.

3 SHEETS—SHEET 3.

Witnesses
Louis M. Stickelhead
Ottilie C. Freiberg

Inventor
William J. Judd
by Chas. G. Page
Atty.

No. 12,309. REISSUED JAN. 31, 1905.

W. J. JUDD.

MACHINE FOR MIXING CONCRETE OR THE LIKE.

APPLICATION FILED MAR. 11, 1903.

8 SHEETS—SHEET 4.

Witnesses
Louis H. F. Whitehead
Ottilie C. Freuberg

Inventor
William J. Judd
by Chas. G. Page
Atty.

No. 12,309. REISSUED JAN. 31. 1905.

W. J. JUDD.

MACHINE FOR MIXING CONCRETE OR THE LIKE.

APPLICATION FILED MAR. 11, 1903.

8 SHEETS—SHEET 5.

Witnesses
Louis M. F. Whitehead.
Otto C. Freiberg

Inventor
William J. Judd
by Chas. G. Page
Atty.

No. 12,309. REISSUED JAN. 31, 1905.

W. J. JUDD.

MACHINE FOR MIXING CONCRETE OR THE LIKE.

APPLICATION FILED MAR. 11, 1903.

8 SHEETS—SHEET 6.

Witnesses
Louis M. F. Whitehead
Ottilie C. Freiberg

Inventor
William J. Judd
by Chas. G. Page
Atty.

No. 12,309. REISSUED JAN. 31, 1905.

W. J. JUDD.

MACHINE FOR MIXING CONCRETE OR THE LIKE.

APPLICATION FILED MAR. 11, 1903.

8 SHEETS—SHEET 7.

Witnesses
Louis M. F. Whitehead
Ottilie C. Friberg

Inventor
William J. Judd
by Chas. L. Page
Atty.

No. 12,309. REISSUED JAN. 31, 1905.

W. J. JUDD.

MACHINE FOR MIXING CONCRETE OR THE LIKE.

APPLICATION FILED MAR. 11, 1903.

8 SHEETS—SHEET 8.

Witnesses:
Louis M. F. Whitehead
Ottilie C. Freiberg

Inventor:
William J. Judd
by Chas. G. Page
Atty.

No. 12,309. Reissued January 31, 1905.

UNITED STATES PATENT OFFICE.

WILLIAM J. JUDD, OF NEW YORK, N. Y., ASSIGNOR TO FREDERICK C. AUSTIN, OF CHICAGO, ILLINOIS.

MACHINE FOR MIXING CONCRETE OR THE LIKE.

SPECIFICATION forming part of Reissued Letters Patent No. 12,309, dated January 31, 1905.

Original No. 705,676, dated July 29, 1902. Application for reissue filed March 11, 1903. Serial No. 147,355.

*To all whom it may concern:*

Be it known that I, WILLIAM J. JUDD, a citizen of the United States, residing at New York, in the county of New York and State of New York, have invented a certain new and useful Improvement in Machines for Mixing Concrete or the Like, of which the following is a specification.

The objects of my invention are to rapidly and effectively mix together the ingredients for forming a batch of concrete, mortar, or the like; to secure a quick and complete discharge of the mixed-up batch; to shorten the distance between the charging and discharge openings of the rotary mixing-receptacle and at the same time increase the capacity of the mixing-receptacle and adapt it to rapidly and effectively eject the batch when it is in position to discharge; to dispense with the use of blades or agitators within the mixing-receptacle, and thereby avoid clogging and permit a free discharge of the batch; to so form the inner walls of the rotary mixing-receptacle that its rotation will cause a quick and effective discharge or ejection of the batch; to provide in connection with a rotary mixing drum or receptacle a support therefor which is particularly adapted for large machines; to support the rotary mixing drum or receptacle in a way whereby the support therefor can be readily tilted and easily stopped at any time during its tilting movement; to balance the rotary mixing-drum and its tilting support, whereby the latter can be easily tilted to any desired extent; to sustain the tilting support for a rotary mixing drum or receptacle upon a bed or base in a novel and improved way; to provide a hopper which can couple with and directly discharge into a rotary tilting mixing drum or receptacle when such drum or receptacle is in receiving and mixing position and which can be uncoupled from such drum or receptacle, so as to permit the same to be tilted for the purpose of discharging its contents; to automatically couple the hopper with the rotary mixing drum or receptacle when the same is brought into position for receiving and mixing; to avoid leakage when the hopper is coupled with a revolving mixing drum or receptacle; to provide certain novel and improved devices for operating a tilting support for a rotary mixing drum or receptacle from the driving power and for automatically disconnecting the driving power from the tilting support when the latter reaches the desired limit of its movement either way; to prevent the materials which are being mixed within the revolving mixing drum or receptacle from splashing out through its discharge-opening; to close the discharge-opening of the rotary mixing drum or receptacle when such drum or receptacle is in mixing position and to automatically open the discharge-opening when the rotary drum or receptacle is brought into position for discharge, and to provide certain details serving to increase the general efficiency of mixing-machines for concrete and the like.

Figure 2:
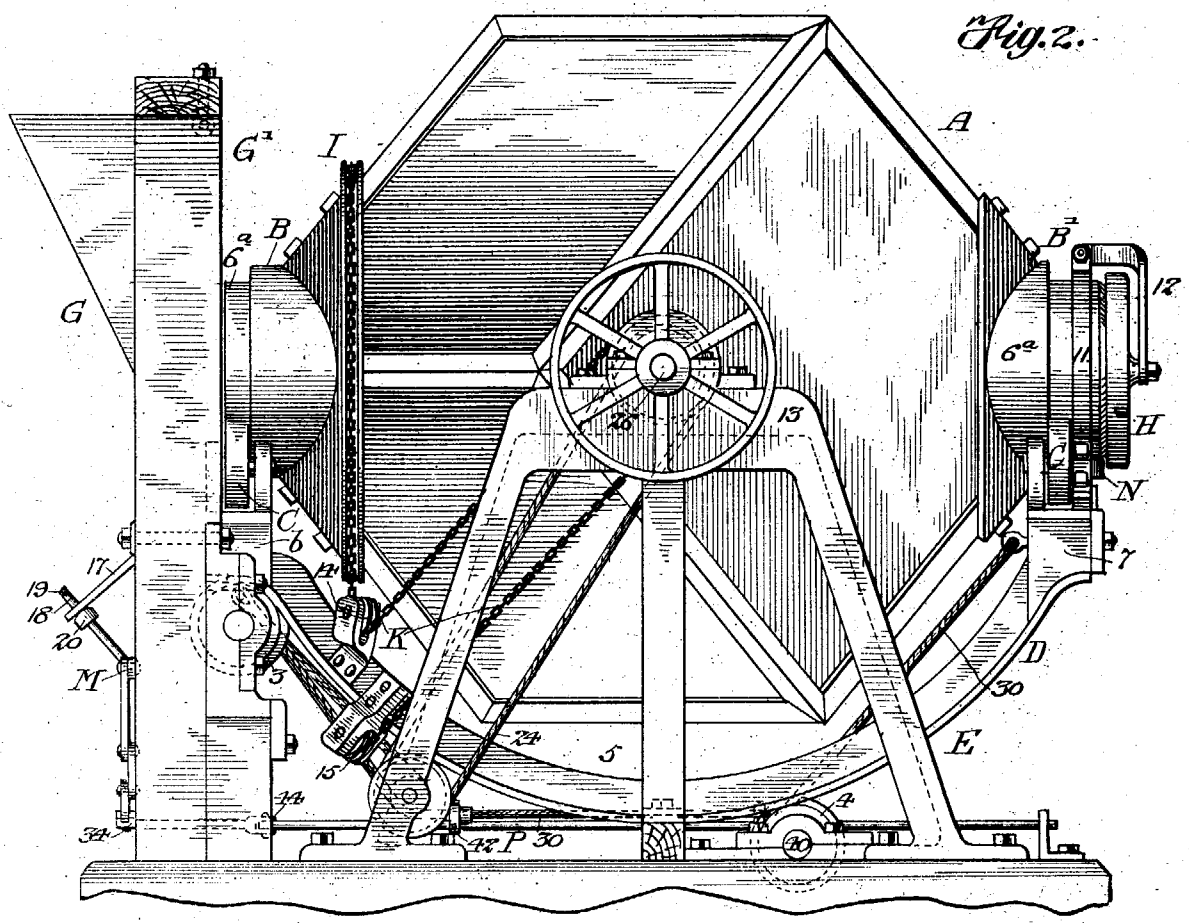
Figure 3:
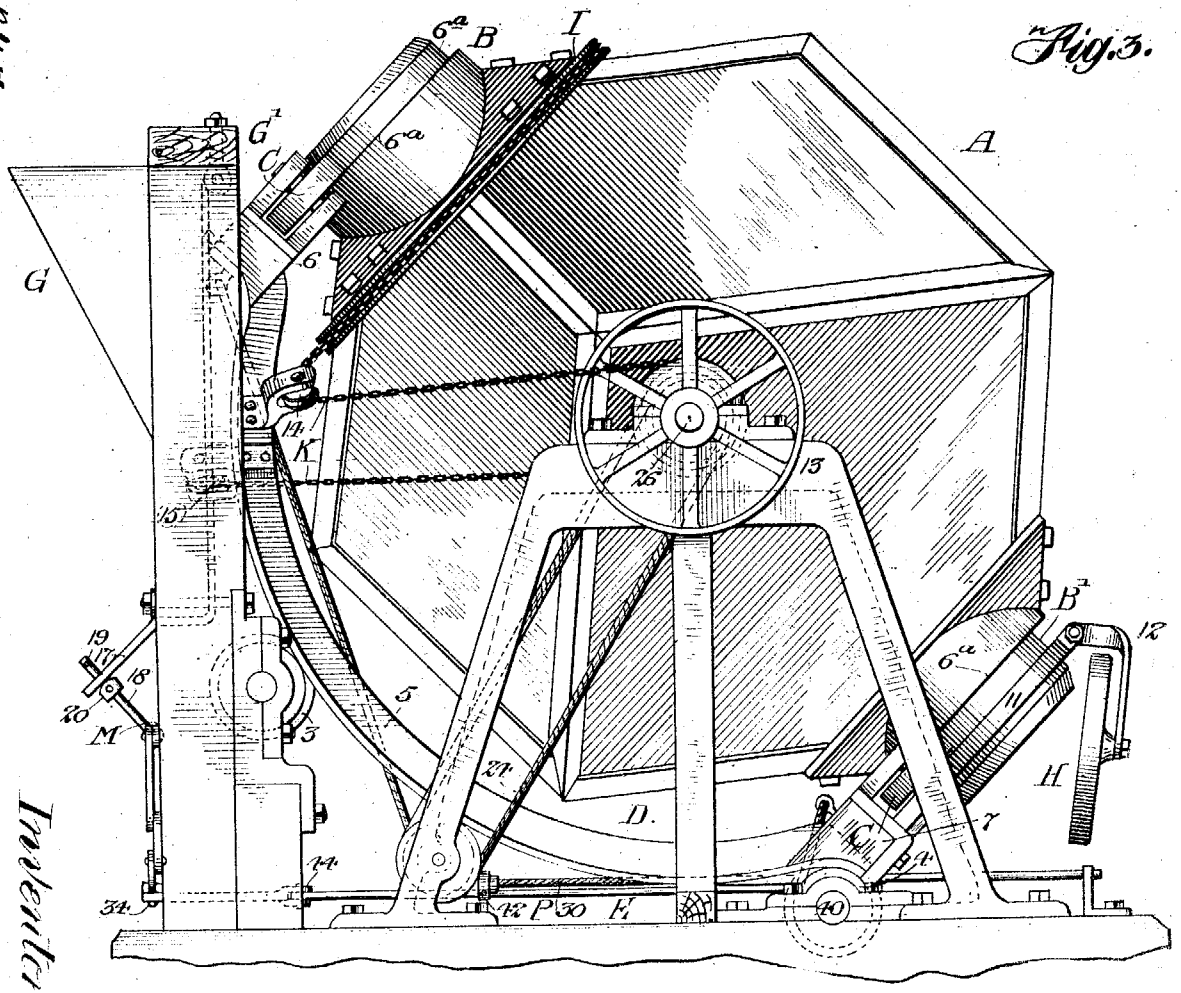
Figure 4:
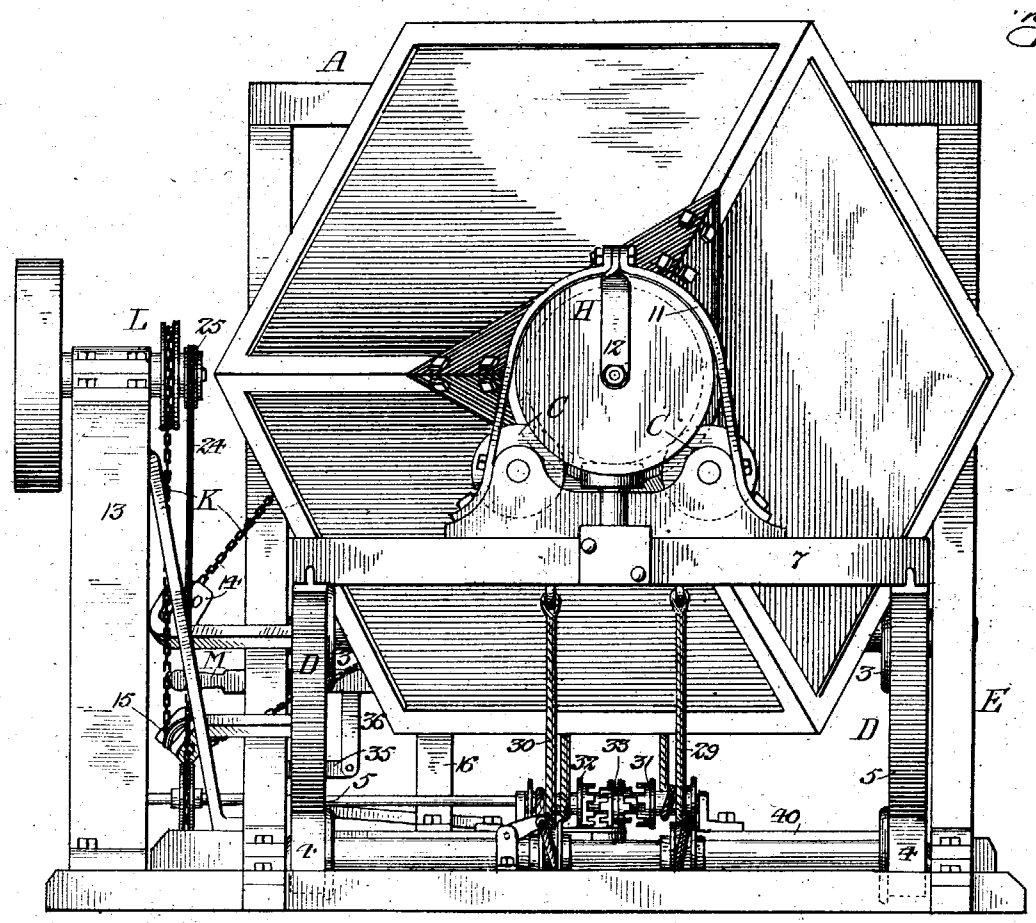
Figure 5:
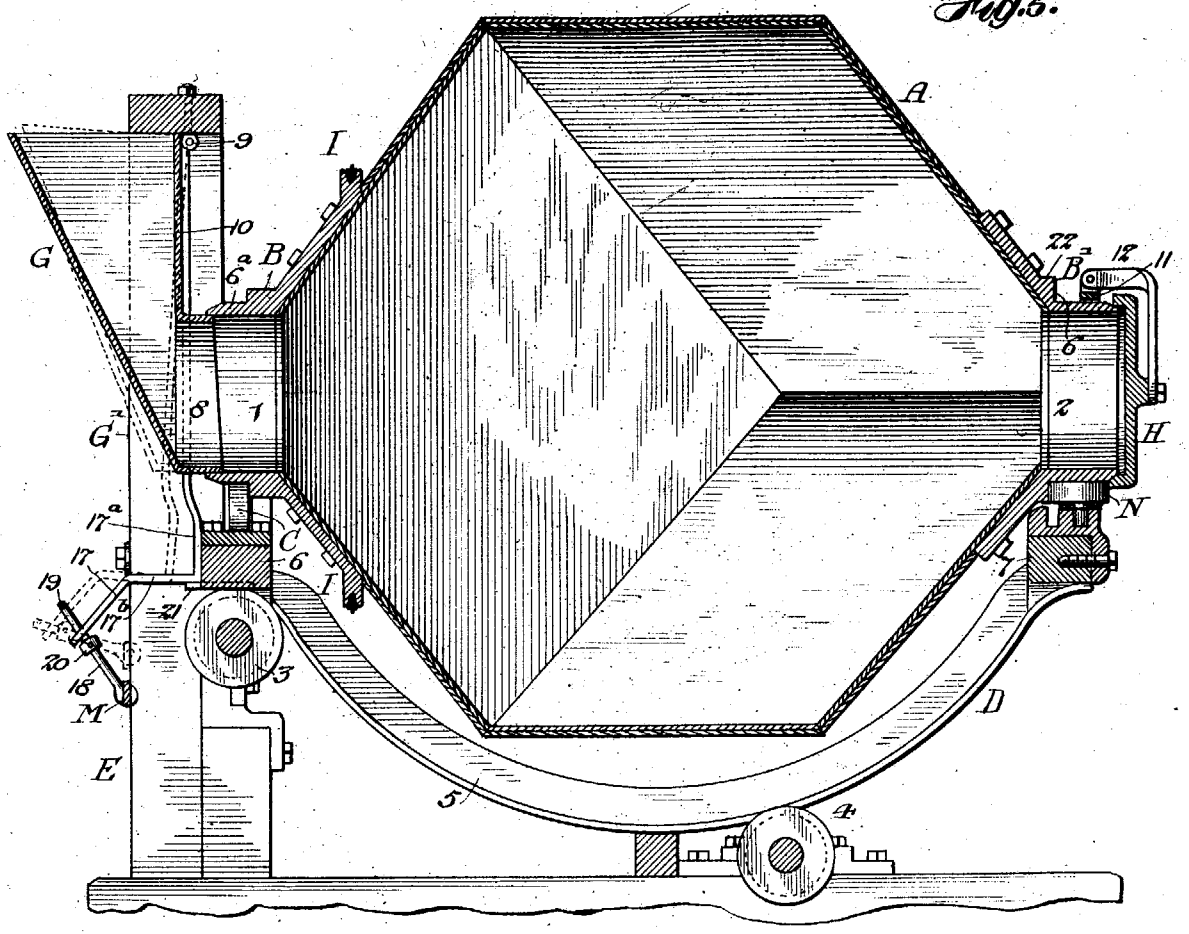
Figure 6:
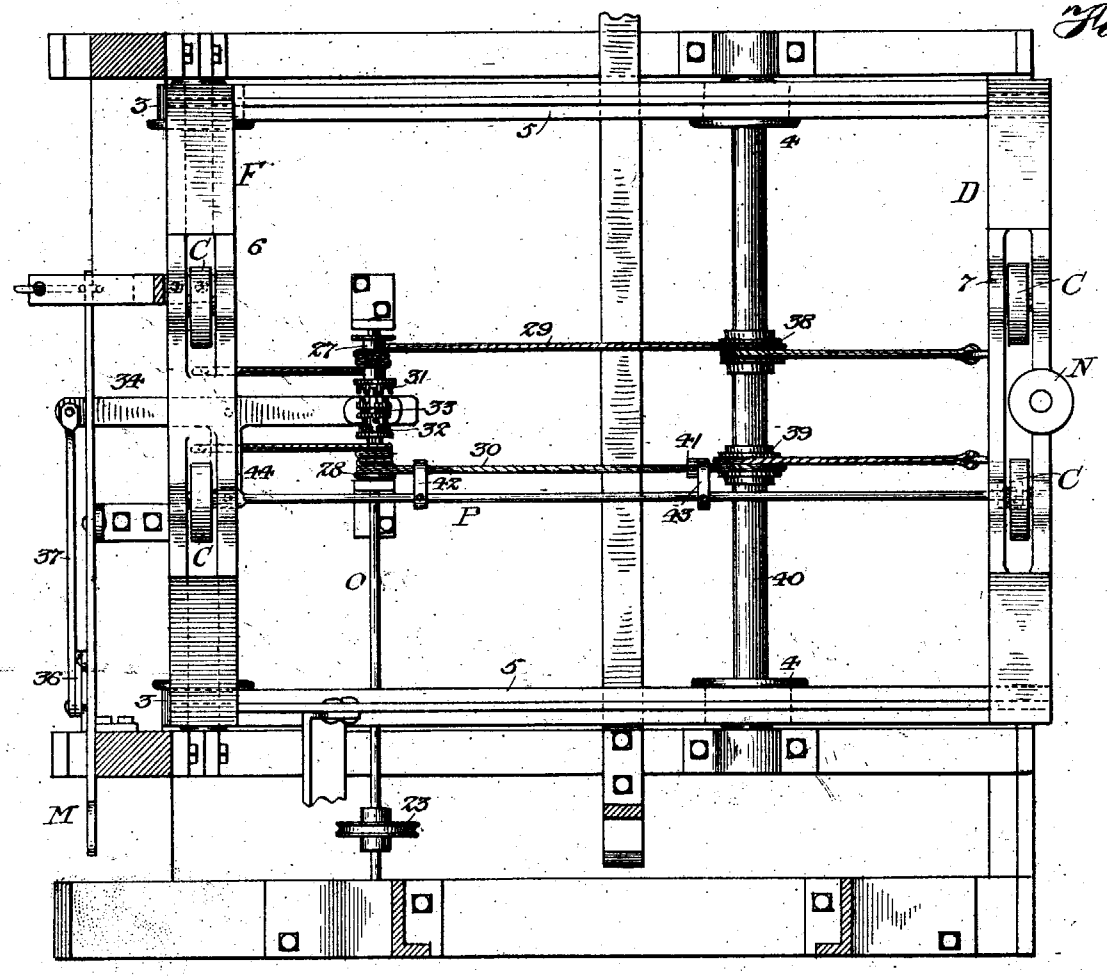
Figure 7:
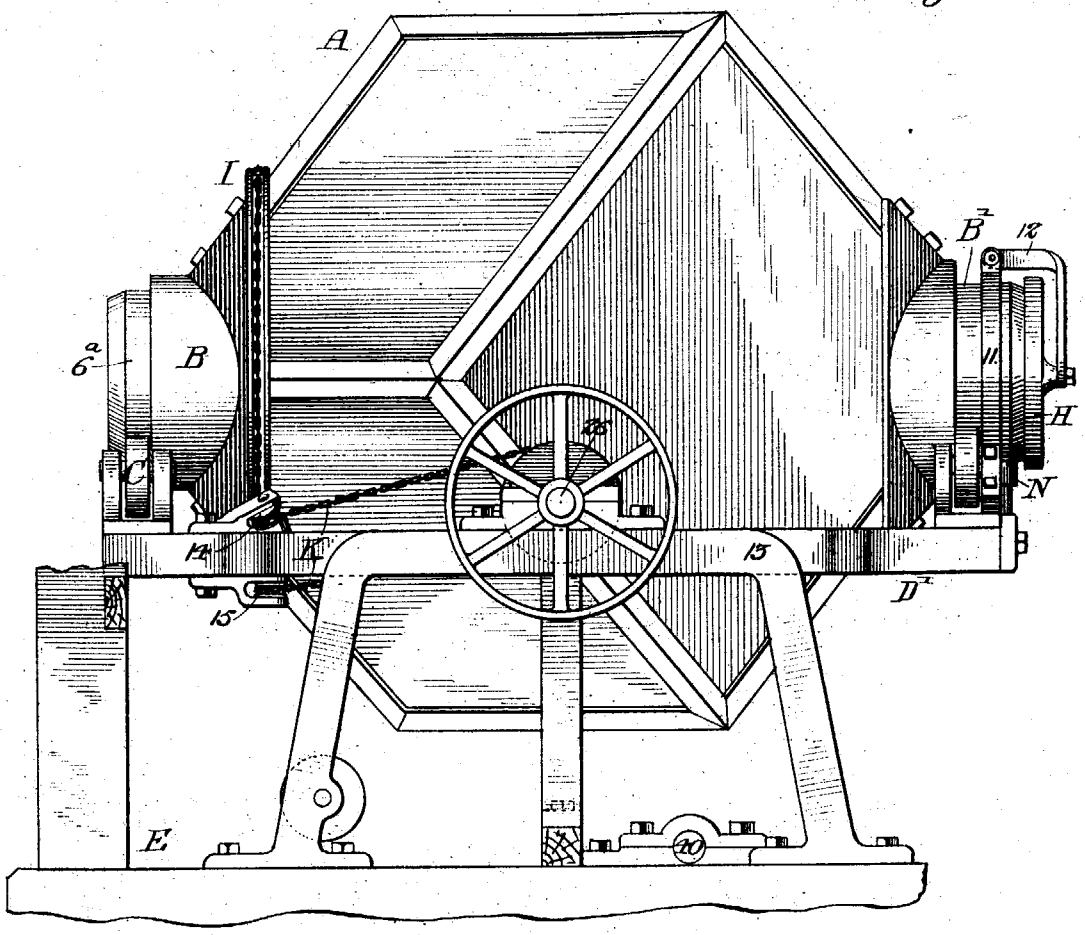
Figure 8:
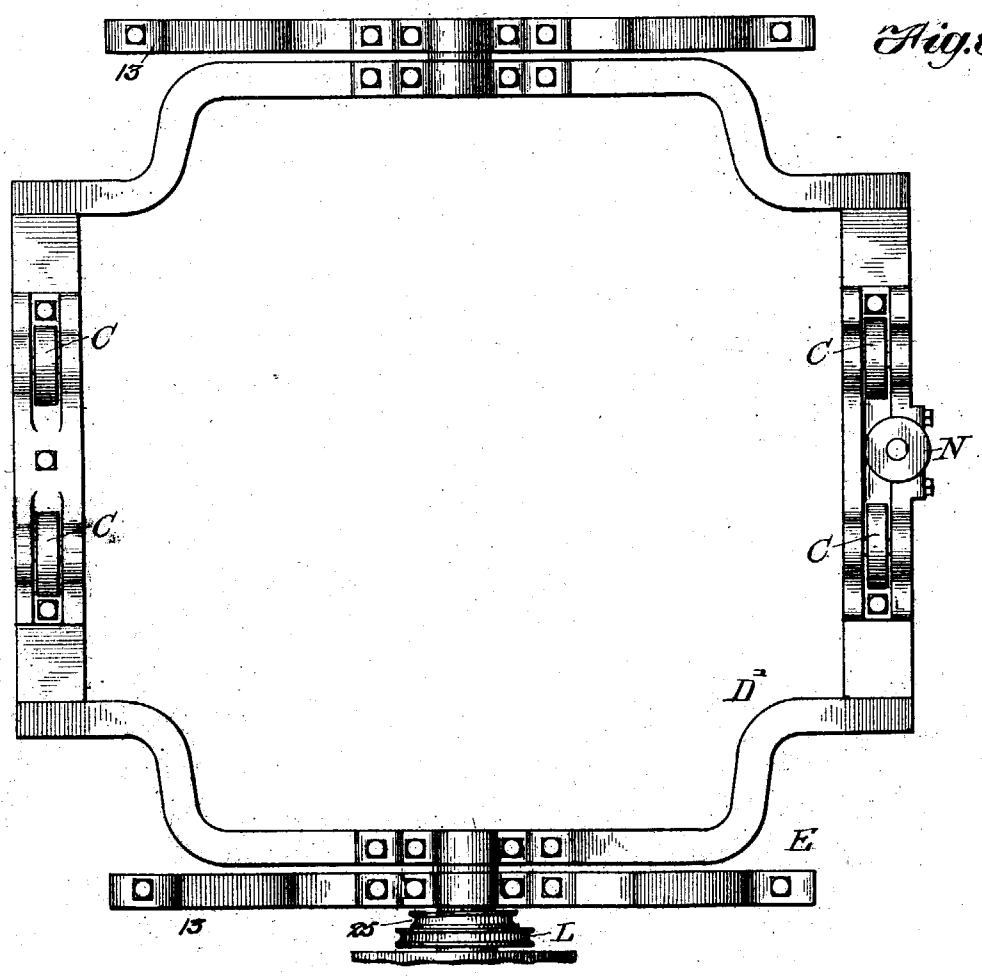

In the accompanying drawings, Figure 1 represents in end elevation a mixing-machine embodying the principles of my invention. Fig. 2 shows the same in side elevation, the rotary mixing-receptacle in this and in the preceding figure being shown in position for receiving and mixing. Fig. 3 is a side elevation of the machine, showing the mixing-receptacle in position for discharging. Fig. 4 is an end elevation similar to Fig. 1, but showing the opposite end of the machine. Fig. 5 is a longitudinal section taken on a vertical central plane through the machine. Fig. 6 is a top plan view with the rotary mixing-receptacle removed. Fig. 7 is a side elevation of a portion of the machine, showing the rotary mixing-receptacle arranged upon a tilting frame or support which is trunnioned or pivotally supported upon the base or bed frame. Fig. 8 is a top plan view of the pivoted or trunnioned frame of Fig. 7 with the rotary mixing-receptacle removed.

Referring to the first six figures, A indicates a cubiform mixing-receptacle having charging and discharge openings 1 and 2, Fig. 5, respectively, at diagonally opposite corner portions. This mixing-receptacle is arranged to rotate about an axis passing through its oppositely-arranged charging and discharge openings and is supported to tilt or oscillate about a horizontal axis transverse to its axis of rotation and passing relatively between its charging and discharge openings, so that while it is being rotated it can also be tilted about an axis transverse to its axis of rotation in order to position its axis of rotation horizontally, or substantially so, for the purpose of mixing its contents or to bring its axis of rotation into an inclined position, and thereby allow its contents to be discharged through the discharge-opening, as may be desired. Practically, therefore, the mixing-receptacle rotates about a tilting axis which passes through its diagonally opposite charging and discharge openings and tilts about a horizontal axis which is transverse to its axis of rotation and relatively between its charging and discharge openings—that is to say, the axis about which it tilts is in point of position between its charging and discharge openings, although such axis may either intersect or be above or below the longitudinal axis about which the mixing-receptacle revolves.

The charging and discharge openings of the mixing-receptacle are prolonged or extended through necks or hollow journals B B′, which project from diagonally corner portions of the receptacle. These necks or hollow journals bear upon antifriction-rolls C, which are in turn arranged upon a tilting support D, adapted to move in conformity with and for the purpose of effecting the desired tilt on the part of the axis about which the mixing-receptacle rotates. The tilting support D is capable of partial rotation in opposite directions about an axis transverse to the axis about which the mixing-receptacle revolves and has a range of movement sufficient to permit it to vary the angle of the axis of rotation of the mixing-receptacle according to requirements. While the mixing-receptacle partakes of the motion of its movable support when the latter is operated to vary the angle of the axis about which such receptacle rotates, the movement of the mixing-receptacle caused by the oscillation or partial rotation of the support D may be conveniently and comprehensively defined as a tilting movement, since the axis about which the mixing-receptacle rotates is tilted, and, moreover, opposite portions of the receptacle in either case tilt about an axis transverse to the axis about which the receptacle as a whole rotates, and likewise while the support D makes a partial rotation about an axis transverse to the axis of rotation of the mixing-receptacle the end portions of the said support, which sustain the mixing-receptacle, necessarily have a tilting movement.

The support D is sustained by and works upon suitably-arranged rotary bearings, such as antifriction-rolls 3 and 4, and is in the nature of a segmental frame or a frame having a segmental bearing portion which bears on the antifriction-rolls and which is shown as being composed of segmental side portions 5 5, which bear upon the antifriction-rolls, the latter being in turn supported upon the base-frame E. With such arrangement the segmental sides 5 can be tied together by any suitable transverse connection—for example, by the end cross-bars 6 and 7 and by any further intermediate transverse connections which may be desired. Force of power suitably applied will cause the segmental support or support having a curved base portion to traverse its supporting-rolls and make a partial rotation in one or the other direction, as the case may be, and in so doing tilt the mixing-receptacle, and thereby vary the angle of axis of revolution of the latter about an axis around which the tilting support operates.

The hollow journals B B′ provide suitably-prolonged charging and discharge passages or openings and also project from the cubiform box to an extent to permit them to properly engage the antifriction-rolls C. The rolls C are arranged to engage these journals at opposite sides thereof, so as to prevent lateral displacement of the mixing-receptacle. To avoid displacement of the mixing-receptacle in a direction coincident with its axis of revolution, the hollow journals are provided with annular offsets 6ª, in which the antifriction-rolls engage. When the mixing-receptacle is in position to receive the materials and to mix them together, its axis of rotation is preferably horizontal, or substantially so, and when in such position it receives the materials from a hopper G, which is supported by a frame-standard G′.

The walls of the hopper are arranged to direct materials thrown therein toward its discharge-opening, which registers with the charging-opening of the mixing-receptacle when the latter is in receiving position, as in Fig. 5. In order to prevent escape of materials passing from the hopper to the mixing-receptacle, the discharge-opening for the hopper is essentially formed through a neck 8, arranged to telescope or couple with the hollow journal B of the mixing-receptacle when such receptacle is in position to receive from the hopper, as best illustrated in Fig. 5. With such arrangement the hopper is movably supported, whereby it can be moved away from the mixing-receptacle when it is desired to turn or tilt the latter into position for discharging its contents. As a simple arrangement the hopper can be hinged at its upper portion upon the standard, as at 9, whereby its lower discharge end can swing toward and away from the mixing-receptacle. Where the hopper is thus arranged as a pendent device, its short discharge neck or spout 8 can project laterally from the side 10 of the hopper, which is opposite the mixing-receptacle, which said side may normally stand on or about a vertical plane, while the remaining sides of the hopper will converge toward its discharge-opening. In Fig. 5 the discharge neck or spout of the hopper is shown as forming a telescopic joint with the hollow journal B of the mixing-receptacle, and in order, therefore, to rock or tilt the latter the pendent hopper must be swung away from the mixing-receptacle and in a direction lateral to a plane transversely intersecting the hollow journal B. As shown, the neck or short spout 8 of the hopper is adapted to enter the hollow journal B of the mixing-receptacle. This arrangement avoids leakage when the hopper is discharging into the mixing-receptacle, and at the same time it permits the mixing-receptacle to be continuously rotated. The discharge-opening of the mixing-receptacle is normally closed by a valve or door H, which is hinge-supported upon the movable support for the mixing-receptacle and arranged so that when the mixing-receptacle is brought into position for discharging its contents the said door will open the discharge-aperture. As a preferred arrangement and matter of further improvement the door H is a gravity-door and made of such weight that it will normally hang as in Fig. 3 when the mixing-receptacle is in position to discharge. With such arrangement the hinged pendent door will automatically close against the hollow discharge-journal B′ of the mixing-receptacle when the latter is brought to the position shown in Fig. 5, and when the mixing-receptacle is brought into discharging position, as in Fig. 3, its hollow discharge-journal will leave the pendent door, as illustrated, and thereby open the discharge-aperture. The support shown for said door comprises a yoke 11, secured upon the movable support D and arranged to straddle the journal B′, and a bent arm 12, secured to the door and hinged to the yoke, so as to permit the door to readily accommodate itself to the discharge opening or end of the journal B′ under different conditions. By such arrangement a larger quantity of material can be mixed and splashing out through the discharge-opening will be avoided. Also when the mixing-receptacle is being rapidly turned or tilted to bring it into position for discharge its contents will not be thrown out from the discharge-opening to an undesirable extent, since in such case this gravity door or valve will serve as a deflector against which the materials ultimately discharged from the mixing-receptacle will impinge.

The form of rotary mixing-receptacle shown permits the materials to be thoroughly and rapidly mixed together, and when such receptacle is turned or tilted so as to incline its axis of rotation and place it in position for discharge the rotation of the mixing-receptacle while in such position will in practice cause a quick clean discharge which serves to empty the receptacle of its contents. This discharge is characterized by a quick and forcible ejection of the contents of the mixing-receptacle.

In connection with the rotary mixing-receptacle I provide mechanism whereby the power employed for rotating such receptacle about an axis passing through its opposite charging and discharge openings can also be employed for turning or tilting it from one to the other of its two extreme positions—viz., from its charging to its discharging position, and vice versa. I also provide mechanism whereby the tilting movement of the rotary mixing-receptacle will be automatically arrested when such receptacle has reached either of its two extreme positions. Broadly considered, the above-mentioned devices for tilting or tipping the mixing-receptacle and for automatically arresting its tilting or tipping motion can be employed in connection with a rotary tilting or tipping mixing receptacle or drum of any known or desired form, and likewise the hopper hereinbefore described can also be employed in connection with other forms of rotary tilting mixing-receptacles having oppositely-arranged charging and discharge openings.

In connection with the movable hopper I provide means whereby it can be readily moved away from the mixing-receptacle whenever it is desired to tilt or tip the latter from its receiving to its discharging position, and I also provide means whereby the hopper is automatically brought into coöperative relationship with the mixing-receptacle when the latter is brought from its discharging to its receiving position. The means or devices thus employed for operating the hopper can also be employed in connection with other desired or suitable forms of mixing-receptacles. More specifically, referring to devices herein illustrated and embodying the principles of my invention, the rotary mixing-receptacle is provided with a sprocket I for an endless driving chain or cable K. This driving chain or cable passes about and is operated by a driving-sprocket L, Fig. 1, on the base-frame or any suitably-supported standard 13 and is conveniently guided by pulleys 14 15 on the movable support for the rotary mixing-receptacle. By such arrangement the driving-gear, comprising an endless chain passing about pulleys on the tilting support and rotary drum or mixing-receptacle, will maintain a uniform relationship to the drum or receptacle and tilting support, since the pulleys on the support will be maintained at a fixed distance from the pulley on the rotary mixing drum or receptacle. The driving-sprocket L revolves and the rotary mixing-receptacle tilts about a common axis, and hence by properly positioning the guide-pulleys 14 and 15 upon the movable support for the rotary mixing-receptacle the tilt or rotary adjustment of such support about said axis for the purpose of tilting or tipping the rotary mixing-receptacle can be effected without causing the driving-chain to either slacken or become unduly taut. When the mixing-receptacle is in position to receive materials from the gravity-hopper, the latter will hang in position to couple or connect with the mixing-receptacle and to discharge therein, as best illustrated in Figs. 2 and 5. When, however, the movable support D for the mixing-receptacle is operated to tilt or tip the latter and bring into position for discharging its contents, as in Fig. 3, the hopper can be caused to move or swing in a direction away from the mixing-receptacle, and thereby uncouple therefrom, so as to permit the movable support and the mixing-receptacle to shift from the position shown in Figs. 2 and 5 to the position shown in Fig. 3. As one way of attaining such result a transversely-arranged lever M is fulcrumed upon the stationary base or frame E and employed for swinging the hopper in a direction away from the mixing-receptacle, so as to uncouple the hopper from the mixing-receptacle when it is desired to cause the latter to tilt or tip in a direction to discharge its contents. The lever M can be fulcrumed upon an upright portion 16 of the base, as in Fig. 1, and have one of its ends connected with a bar or arm 17, which is secured to one side of the hopper. The connection shown between the lever M and the bar or arm 17 on the hopper consists of a rod 18, attached to the lever and extending upwardly through an opening in the bar 17. The rod 18 has thereby a sliding connection with the bar 17, the extent of its movement independently of the bar being limited by stops 19 and 20 on the rod. When, therefore, the handle end of the lever M is depressed, its opposite end will rise, and thereby move rod 18 upwardly, and as the result of such action stop 20 will be forced against the lower inclined portion of bar 17, and thereby cause the hopper to which bar 17 is secured to swing in a direction away from the mixing-receptacle and disconnect or uncouple its discharge-passage from the charging-opening of the mixing-receptacle. This action also frees the bar 17 from a catch 21, which is arranged upon the movable support D and positioned to engage under a short horizontal portion $17^b$, Fig. 5, of the bar 17, it being observed that the lower portion of this bar is bent to form a shoulder under which catch 21 can engage, so as to normally hold the support D against movement, and that its lower terminal portion is inclined, as hereinbefore mentioned. After the hopper has been thus swung away from the mixing-receptacle, as indicated by dotted lines in Fig. 5, the support D can be partially rotated, so as to tilt the mixing-receptacle into position for discharging its contents, as in Fig. 3, and during such movement on the part of the support for the mixing-receptacle its catch or lip 21 will ride upwardly along the bar 17 and gradually permit the hopper to fall or swing back to its normal position. When the support D for the mixing-receptacle is operated in a reverse direction, so as to bring the mixing-receptacle from the position shown in Fig. 3 to the position shown in Fig. 5, the catch or stop 21 on the movable support will ride downwardly along the bar 17 and force and hold the hopper away from the mixing-receptacle until the latter is in receiving position, at which juncture the lip will clear the upright portion $17^a$ of the bar 17, and thereby allow the hopper to swing into position to couple or connect with the mixing-receptacle, as shown in full lines in Fig. 5. When, therefore, the mixing-receptacle is in receiving position, it is locked or held against tilt, and when it is desired to tilt such receptacle, so as to position it for discharge, it is unlocked, and the hopper is uncoupled or disconnected from its receiving-opening. On the other hand, when the mixing-receptacle is brought into receiving position the hopper automatically connects or couples with its receiving-opening. When the mixing-receptacle is in position to discharge, the end thrust incident to such position is taken by an antifriction-roll N, Fig. 5, carried by the movable support D and arranged to rotate about an axis at right angles to the axis about which the mixing-receptacle rotates, the mixing-receptacle being in such case provided with an annular race or bearing 22, which engages the roll N. Any other suitable form of roll or ball-bearing may, however, be provided for thus sustaining this end thrust of the mixing-receptacle when the latter is in position to discharge its contents. The hand-lever M can also be employed for operating-clutches, whereby the driving power can be connected with the movable support D, so as to operate the latter. As best illustrated in Figs. 1 and 6, O indicates a transversely-arranged counter-shaft having a sprocket or pulley 23, which is connected by a link or chain belt 24 or other suitable power-transmitting connection with a pulley or sprocket 25 on a driving-shaft 26, which latter carries the driving sprocket or wheel L, hereinbefore described. The axis of this driving-shaft L is in alinement with the axis, about which the movable support D makes its partial rotations and about which the mixing-receptacle tilts or tips. The counter-shaft O is provided with a couple of loose-winding drums 27 and 28, Fig. 6, the former for a chain or cable 29, which connects with opposite end portions of the movable support D and the latter for a chain or cable 30, which likewise connects with opposite ends of said movable support. These chains or cable 29 and 30 are arranged to relatively wind in opposite directions upon their said winding-drums, whereby while the counter-shaft O rotates in one direction only the movable support D will be moved in one or the other direction, according to which one of the two winding-drums is in action. The winding-drum 27 is provided with a clutch-section 31, and the winding-drum 28 is provided with a clutch-section 32, and between these two clutch-sections is a double-clutch section 33, which is keyed or feathered upon the counter-shaft O, so as to rotate therewith and also slide thereon. When, therefore, the double-clutch section 33 is shifted so as to engage the clutch-section on one of the winding-drums, the cable passing about such drum will be operated in a way to positively move the support D in a direction to tilt the mixing-receptacle from its receiving to its discharging position, while the other cable will simply wind upon and unwind from the drum about which it passes. On the other hand, when clutch-section 33 is shifted to engage the clutch-section of the above last-mentioned winding-drum the latter will operate its cable in a way to positively move the support F in a direction to restore the mixing-receptacle to its receiving position, while the other cable will simply wind upon and unwind from the winding-drum about which it passes.

In Fig. 6 the movable support D for the mixing-receptacle is understood to be in position to place the charging-opening of the mixing-receptacle in register with the discharge-opening of the hopper. Under the arrangement shown in said figure the movement of support D in a direction to bring the mixing-receptacle into position for discharging its contents can be effected by bringing clutch members 33 into clutch with the clutch member 31, whereby the winding-drum 27 will rotate with shaft O in a direction to wind up the cable portion shown at the right of said drum and pay out the cable portion shown at the left of the drum, while, on the other hand, the drum 28 being loose on the shaft will be revolved by the action of cable 30 in a direction the reverse of the rotation of drum 27, the portion or cable 30 at the right of drum 28 being wound on the drum while its portion at the left of such drum pays out. In bringing the mixing-receptacle from its discharging to its charging position the converse of the foregoing-described operation takes place. The clutch 33 can be shifted by a vibratory clutch-lever 34, which latter can in turn be operated from lever M through the medium of a bell-crank 35, Fig. 1, pivoted on the base-frame, a link 36 connecting lever M with one arm of the bell-crank and a connecting-rod 37 connecting the other arm of the bell-crank with the clutch-lever 34. By such arrangement I provide a clutch device and a clutch-shifter, whereby the power employed to continuously revolve the mixing-receptacle can at will be applied for moving the support for the mixing-receptacle in either direction.

In order to guide the chains or cables 29 and 30, I pass them about pulleys 38 and 39, Fig. 6, on a shaft 40, which is supported by the base-frame.

When the movable support for the rotary mixing-receptacle reaches either of the two extremes of its required movement, the clutch, which is in positive connection with driving power, is automatically freed therefrom, so as to assert the movement of the movable support at a proper moment. As a way in which this can be attained I secure upon one of the cables a stop 41, Fig. 6, and suitably support upon the base-frame a clutch-shifting rod P, which is provided with a pair of stops or abutments 42 and 43, and pivotally connected with an arm 44 of the clutch-lever 34. When, therefore, clutch member 33 is placed in clutch with clutch member 31, the cables 29 and 30 will travel to the left until stop 41 on one of such cables engages stop 42 on the rod P, at which juncture the action of stop 41 against the stop on the rod will cause the latter to shift in a direction to operate the clutch-lever 34, and thereby disconnect clutch member 33 from clutch member 31. In this way the cable 29 will be disconnected from the driving power when the rotary mixing-receptacle reaches a position for discharging its contents. On the other hand, when clutch member 33 is placed in clutch with clutch member 32 the movable support for the mixing-receptacle will be operated in a direction to bring the latter into receiving position, and at a proper moment such movement of the movable support for the rotary mixing-receptacle will be checked by reason of stop 41 moving with cable 30 from left to right and acting against stop 43 on rod P, so as to shift the latter in a direction to cause clutch member 33 to separate from clutch member 32. By such arrangement the movable support for the mixing-receptacle is automatically disconnected from the driving power when it reaches the two extremes of its desired extent of movement, which said two extremes of movement determine the receiving and discharging positions of the rotary mixing-receptacle.

In order to swing the hopper away from the mixing-receptacle and simultaneously therewith to shift clutch member 33 into clutch with the clutch member on winding-drum 27, it will only be necessary for the attendant to depress the handle end of lever M, which latter will thereby be swung in a direction to cause stop 20, Fig. 2, to act against the lower inclined end portion of the arm or bar 17 on the swinging hopper and also to cause the clutch-lever 34, through the medium of its connections with lever M, to throw clutch member 33 into clutch with the clutch member 31. When the mixing-receptacle is in position to discharge and it is desired to cause it to move into position to receive from the hopper, the attachment will raise the handle end of lever M, whereby the latter through the medium of its connections with the clutch-lever 34 will cause such clutch-lever to operate in a direction to throw clutch member 33 into clutch with clutch member 32 on the winding-drum 28. When the movable support for the mixing-receptacle is thus caused to move in a direction to shift the mixing-receptacle from its discharging to its receiving position, the lip or projection 21 on the movable support will engage arm 17, and thereby swing and maintain the hopper away from the mixing-receptacle until such projection 21 passes below the lower horizontal portion $17^b$ of the bar or arm *b*, at which juncture the arm and hopper will swing back into the position shown in Fig. 5.

Figs. 7 and 8 illustrate a tilting frame D′, pivoted or trunnioned upon side standards of the bed or base frame and employed in place of the segmental tilting frame D, hereinbefore described. Where the pivoted frame D′ is thus employed in place of the segmental tilting frame D, all of the other matters illustrated by the first six figures can be applied, as will be understood without further illustration and description, and hence various matters shown in the first six figures are omitted from Figs. 7 and 8 simply for convenience in illustrating the use of a pivoted frame. It is also understood that the hopper and the mechanism or devices for connecting and disconnecting the driving power with and from the tilting support can be employed in connection with any other desired form or construction of tilting support and with any suitable form or construction of rotary tilting mixing drum or receptacle.

With further reference to the rotary tilting cubiform mixing-receptacle illustrated I am enabled by such construction and arrangement to provide a batch-mixer of large capacity without undesirably prolonging the machine and to quickly and effectively discharge the batch of material therefrom. I am also enabled by such construction and arrangement to dispense with the use of mixing-blades arranged within the mixing-receptacle and to rapidly and effectively mix the materials without clogging and to discharge the same more freely and perfectly than where such mixing-blades are used. This rotary tilting mixing-receptacle may be of a cube or practically of a cube shape, or its shape may be somewhat modified without departing from the general principles of a mixing-receptacle in the precise form of a cube—as, for example, the mixing-receptacle could be somewhat prolonged in the direction of its axis at the expense of making a longer receptacle, or the angles of its sides could be somewhat varied or its sides could be multiplied. It is understood, therefore, that I desire to broadly cover a cubiform or polyhedric rotary tilting receptacle having charging and discharge openings, respectively, at opposite corners and respectively adapted and arranged for admitting a batch of materials and for discharging the batch when mixed, but that I regard a cubiform receptacle substantially as shown and operated as a matter of further and special improvement.

I am aware that rotary cubiform or polyhedric concrete mixing-receptacles have heretofore been proposed, as evidenced by Letters Patent of the United States No. 306,522 to E. L. Ransome, dated October 14, 1884, No. 366,591 to J. Lundie, dated July 12, 1887, and No. 467,302 to Pitchford and Cooper, dated January 19, 1892. These patents, however, do not embody the feature of a rotary cubiform or polyhedric mixing-receptacle arranged to revolve about a tilting axis and having openings at diagonally opposite corners or vertices, respectively, for receiving a batch of materials and for discharging the mixed-up batch. In the machines shown in said patents the batch is dumped by providing the receptacle with a side door, which is opened to permit the discharge when the rotary receptacle is brought to a standstill. In accordance with my invention, however, the rotary receptacle revolves about a tilting axis extending through opposite corners or vertices formed by intersecting planes, whereby the charge or batch will dump or discharge when the axis of rotation is tilted and while the receptacle is rotating. This arrangement insures rapid and thorough mixing of the materials without the assistance of mixing-blades, which induce clogging of the materials and retard the discharge, it being also observed that the plane surfaces arranged to form angles within the rotary tilting receptacle will keep up the agitation of the materials to the point where the batch enters the discharge-opening. The rotary mixers of said patents do not, therefore, attain the improved results developed and attained by my invention.

With further reference to the securement of a quick and complete discharge of the mixed-up batch of concrete or mortar when the cubiform mixing box or receptacle is turned or tilted about a transverse horizontal axis, so as to incline its axis of rotation, which passes through diagonally opposite corners or vertices, as in Fig. 3, in which such mixing-receptacle is shown in position for discharge, it will be observed that the lowest portion of the receptacle, which immediately extends back from the opening through which the discharge takes place, need not at any time in the rotation of the cubiform receptacle slope downwardly toward said opening and that it will not so incline when the axis of rotation has the degree of inclination illustrated by Fig. 3, and hence that as an inclination of said lowest or under side portion of the receptacle downwardly toward the discharge-opening is not relied upon as a means for allowing the batch to slide out the receptacle need not be tilted to depress its discharge-opening to a greater extent than shown in Fig. 3, and in this way the receptacle need not be tilted to an extent to bring the discharge-opening inconveniently under the receptacle. When the receptacle is thus in position to discharge, the material which is ejected through the discharge-opening does not slide down and out along an inclined bottom way or gutter portion formed by a portion of the box, but is elevated within the receptacle and then directed to the discharge-opening, whereby it is effectively freed from the inner sides of the receptacle. The principle of this discharge involves as a peculiar action the revolution of all of the corner portions of the cubiform box or receptacle, with the exception of the two diagonally opposite corners through which the axis of rotation passes, about said axis in inclined planes transverse to the axis of rotation and inclining upwardly and forwardly, and in this way material in a lower corner portion is carried upwardly and forwardly toward the end of the machine at which the discharge is effected. For example, in Fig. 3 the box is shown with its lowest corner portion in position for containing a quantity of material. If now the box is revolved, this corner portion will swing upwardly and forwardly, as to the right in said figure, until it is in position over the discharge-opening, and thence it will swing downwardly and back, as to the left, until it again reaches its position shown in Fig. 3, and during such operation the remaining corners, with the exception of the two corners through which the axis of rotation passes, will have similar movements. It will also be observed that when, for example, the corner referred to is at the highest point attained during its revolution the side of the box shown in Fig. 3 will be shifted to a horizontal plane and momentarily form the top side of the receptacle and that its action in approaching such position tends to divert the material forwardly. It is not deemed necessary to thus follow the movements of all of the remaining sides of the box, it being understood that by their peculiar shifting to different angles when the axis of rotation is inclined, as in Fig. 3, the material is violently agitated, so as to free it from the walls of the receptacle and at the same time rapidly and effectively diverted and directed to the discharge-openings by reason of the shift in position of the inner walls of the mixing box or receptacle.

What I claim as my invention is—

1. In a mixing-machine for concrete and the like, a cubiform rotary mixing-receptacle provided at diagonally opposite corner portions with charging and discharge openings respectively for receiving a batch of materials, and for discharging the mixed-up batch, said mixing-receptacle being arranged to revolve about a tilting axis which can be tilted in opposite directions for the purpose set forth.

2. In a mixing-machine for concrete and the like, a rotary cubiform mixing-receptacle arranged to revolve about a tilting axis passing through diagonally opposite corner portions, and provided at such corner portions with oppositely-positioned charging and discharge openings adapted for respectively receiving a batch of materials and for discharging the mixed-up batch; and a tilting support for the rotary, cubiform mixing-receptacle arranged to tilt in opposite directions about an axis transverse to the axis of rotation of said mixing-receptacle.

3. In a batch-mixing machine for concrete and the like, a polyhedric mixing-receptacle arranged to revolve about a tilting axis passing through opposite corners or vertices formed by intersecting planes, and provided at such portions with oppositely-positioned charging and discharge openings adapted for respectively receiving a batch of materials and discharging the mixed-up batch; and a tilting support for the rotary, polyhedric mixing-receptacle arranged to tilt about an axis transverse to the axis of rotation of said mixing-receptacle and relatively between the charging and discharge openings of the latter.

4. In a mixing-machine for concrete and the like, a rotary, cubiform mixing-receptacle provided at diagonally opposite corner portions with hollow journals forming charging and discharge openings adapted for respectively receiving and discharging a batch; and a tilting support for said mixing-receptacle provided with bearings for the hollow journals of the latter and arranged to tilt about an axis transverse to the axis of rotation of the rotary, cubiform mixing-receptacle and relatively between the hollow journals of such mixing-receptacle.

5. In a batch-mixing machine for concrete and the like, a rotary cubiform mixing-receptacle provided at diagonally opposite corner portions with hollow journals forming charging and discharge openings adapted for respectively receiving and discharging a batch; a tilting support for said mixing-receptacle provided with bearings for the hollow journals thereof and arranged to tilt about an axis relatively between such hollow journals and transverse to the axis about which the mixing-receptacle revolves; power-transmitting mechanism for continuously rotating the mixing-receptacle whereby it can be revolved while receiving, mixing, and discharging; and mechanism for operating the tilting support so as to tilt the axis of rotation of the mixing-receptacle.

6. In a batch-mixing machine for concrete and the like, a substantially cubiform, rotary mixing-receptacle provided at diagonally opposite corner portions with hollow journals forming charging and discharge passages or openings adapted for respectively receiving and discharging a batch; a tilting support for the mixing-receptacle having antifriction-rolls which engage the hollow journals; mechanism for tilting said support; mechanism for rotating the mixing-receptacle; and means for applying the driving power to the mechanism employed for tilting the support.

7. In a machine for mixing concrete and the like, a substantially cubiform rotary mixing-receptacle having charging and discharge openings at diagonally opposite corner portions; a tilting support for the rotary mixing-receptacle; mechanism for applying the driving power to the rotary mixing-receptacle; and mechanism for applying the driving power to the tilting support so as to tilt the same.

8. In a machine for mixing concrete and the like, a substantially cubiform, rotary mixing-receptacle having charging and discharge openings at diagonally opposite corner portions; a tilting support for the rotary mixing-receptacle; mechanism for tilting said support in opposite directions; mechanism for arresting the tilting action of the support; and mechanism for applying the driving power to actuate the mechanism for tilting the support.

9. In a machine for mixing concrete and the like, a substantially cubiform, rotary mixing-receptacle having charging and discharge openings at diagonally opposite corners; power-actuated mechanism respectively for rotating the mixing-receptacle and tilting the support therefor; mechanism involving a clutch for applying and disconnecting the power to and from the tilting support so as to tilt the latter when the power is thus applied, and arrest the tilting action of such support when the power is disconnected therefrom.

10. In a machine for mixing concrete and the like, a rotary, polyhedric mixing-receptacle substantially as set forth provided at opposite corner portions vertices with hollow journals forming charging and discharge passages; a tilting support for the polyhedric mixing-receptacle; and a movable hopper having a discharge-neck adapted to couple with and uncouple from one of the said hollow journals.

11. In a machine for mixing concrete and the like, a rotary mixing-receptacle; and a tilting support for the rotary mixing-receptacle having a curved bearing portion arranged to traverse a rotary bearing so as to tilt the rotary mixing-receptacle which is supported to rotate upon such tilting support.

12. In a machine for mixing concrete and the like, a rotary mixing-receptacle having oppositely-arranged charging and discharge openings and arranged to revolve about an axis extending through its charging and discharge openings; a tilting support for the rotary mixing-receptacle consisting of a frame having a segmental base; and rotary bearings forming a way along which the segmental base is arranged to move in a curvilinear path.

13. In a machine for mixing concrete and the like, a rotary mixing-receptacle; a support for the rotary mixing-receptacle comprising a tilting frame having a curved base; and antifriction-rolls engaging said curved base and supporting the tilting frame; the curved base and the supporting-rolls being relatively arranged to permit the tilting frame to turn about an axis transverse to the axis about which the mixing-receptacle revolves and to thereby tilt such axis.

14. In a machine for mixing concrete and the like, a rotary mixing-receptacle; a support for the rotary mixing-receptacle arranged to turn about an axis transverse to the axis about which the mixing-receptacle revolves; rotary bearings upon which the support for the mixing-receptacle moves in direction to tilt the latter; and mechanism for rotating the mixing-receptacle independently of its tilting support while the support therefor is being turned and tilted.

15. In a machine for mixing concrete and the like, a tilting frame having segmental bearing portions; a rotary mixing-receptacle journaled at opposite ends of the tilting frame which latter turns about an axis transverse to the axis about which the mixing-receptacle revolves; rotary bearings upon which the tilting support is arranged to move; mechanism for revolving the mixing-receptacle while it is being tilted; and mechanism for arresting the tilting motion of the support for the mixing-receptacle.

16. In a machine for mixing concrete and the like, a rotary mixing-receptacle; a tilting support for the rotary mixing-receptacle; and power-transmitting connection for operating the rotary mixing-receptacle comprising a power-driven endless chain or belt passing about pulleys respectively connected with the rotary mixing-receptacle and the tilting support therefor so as to maintain an invariable relationship.

17. In a machine for mixing concrete and the like, a rotary mixing-receptacle; a tilting support for the rotary mixing-receptacle; a driving-pulley positioned to rotate about an axis transverse to the axis of revolution of the mixing-receptacle, the said pulley and the tilting support being arranged to operate about an axis common to both of them; a pulley fixed on the rotary mixing-receptacle; guide-pulleys arranged upon the tilting support; and an endless chain or belt arranged to pass about all of said pulleys.

18. In a mixing-machine for concrete and the like, a rotary mixing-receptacle; a tilting support for the rotary mixing-receptacle; a rotary winding-drum; a chain or cable passing about the rotary winding-drum and connected with opposite end portions of the tilting support; and a clutch device for connecting and disconnecting the winding-drum with and from suitable driving power.

19. In a machine for mixing concrete and the like, a rotary mixing-receptacle; a tilting support for the rotary mixing-receptacle; a pair of loosely-mounted winding-drums; chains or cables passing about the winding-drums respectively in reverse direction and connected with opposite end portions of the tilting support; and a clutch device alternately connecting the winding-drum with suitably-applied driving power.

20. In a machine for mixing concrete and the like, a rotary mixing-receptacle; a tilting support for the rotary mixing-receptacle; two loosely-mounted winding-drums; chains or cables passing about the winding-drums respectively in reverse directions and connected with opposite end portions of the tilting support; a clutch device for alternately connecting the winding-drums with the driving power; a stop on one of the chains or cable; and a clutch-shifting device which is actuated by said stop when the tilting support reaches either end of its required movement.

21. In a machine for mixing concrete and the like, a rotary mixing-receptacle; a tilting support for the rotary mixing-receptacle; mechanism for applying the driving power to the tilting support so as to tilt the same in either direction; and means for reversing the driving power thus applied to the tilting support, and comprising a rotary power-driven shaft, a double-clutch device, and a clutch-shifting lever.

22. In a machine for mixing concrete and the like, a rotary mixing-receptacle; a tilting support for the rotary mixing-receptacle; mechanism for reversibly applying the driving power to the tilting support so as to tilt the latter alternately in opposite directions; and an automatic stop device applied to automatically disconnect the driving power from the tilting support.

23. In a machine for mixing concrete and the like, a rotary mixing-receptacle; a tilting support for the rotary mixing-receptacle; mechanism for reversibly applying the driving power to the tilting support so as to tilt the same alternately in opposite directions; a starting-lever M, and power-transmitting connection between said lever and the mechanism for reversibly applying the driving power to the tilting support.

24. In a machine for mixing concrete and the like, a rotary tilting mixing-receptacle provided with charging and discharge openings; and a movable hopper arranged to couple with the charging-openings of the rotary mixing-receptacle, the hopper being supported for movement in directions to permit it to couple with the charging-opening of the rotary mixing-receptacle when the latter is in receiving and mixing position, and to uncouple and move away from the rotary mixing-receptacle in order to permit the latter to tilt.

25. In a machine for mixing concrete and the like, a rotary, tilting mixing-receptacle provided with charging and discharge openings; and a vibratory, pendent hopper adapted and arranged for coupling with and uncoupling from the charging-opening of the rotary, tilting mixing-receptacle when the latter is in receiving and mixing position.

26. In a machine for mixing concrete and the like, a rotary, tilting mixing-receptacle provided with oppositely-arranged charging and discharge openings and having its charging-opening formed or extended through a hollow neck; and a movable hopper having its discharge-opening through a hollow neck adapted to telescope with said hollow neck of the rotary mixing-receptacle, the hopper being movable in directions to couple with and uncouple from the rotary mixing-receptacle.

27. In a machine for mixing concrete and the like, a rotary, tilting mixing-receptacle; and a vibratory hopper arranged to automatically couple with the rotary mixing-receptacle when the latter is tilted into position for receiving and mixing.

28. In a machine for mixing concrete and the like, a rotary mixing-receptacle provided with oppositely-arranged hollow journals respectively forming charging and discharge passages; a tilting support for the rotary mixing-receptacle provided with antifriction-rolls forming bearings for the hollow journals of the rotary mixing-receptacle; and a pendent, swinging hopper having a hollow neck or short spout adapted to couple with and uncouple from one of the hollow journals of the rotary mixing-receptacle.

29. In a machine for mixing concrete and the like, a rotary mixing-receptacle provided with oppositely-arranged charging and discharge openings; a tilting support for the rotary mixing-receptacle; a movable hopper which is normally in position to connect with and discharge into the rotary mixing-receptacle; and a stop device for automatically stopping the tilting support when the latter is brought into position to place the charging-opening of the rotary receptacle in register with the discharge-opening of the hopper.

30. In a machine for mixing concrete and the like, a rotary, tilting mixing-receptacle having oppositely-arranged charging and discharge openings; a movable hopper having a laterally-arranged discharge-opening, and normally in position to place its discharge-opening in alinement with the charging-opening of the rotary mixing-receptacle when the latter is in mixing and receiving position.

31. In a machine for mixing concrete and the like, a rotary mixing-receptacle; a tilting support for the rotary mixing-receptacle; a vibratory hopper; a stop device for stopping the tilting support when the rotary mixing-receptacle is in position to connect a movable member arranged for swinging the hopper away from the mixing-receptacle and tilting support therefor.

32. In a machine for mixing concrete and the like, a rotary mixing-receptacle having charging and discharge apertures; a tilting support for the rotary mixing-receptacle; and a valve or door hung upon the tilting support and arranged for automatically opening and closing the discharge-aperture of the rotary mixing-receptacle according to the directions in which such receptacle is tilted.

33. In a machine for mixing concrete and the like, a rotary mixing-receptacle having charging and discharge apertures; a tilting support for the rotary mixing-receptacle; and a gravity valve or door H hinge-supported upon the tilting support and arranged for opening and closing the discharge-aperture of the rotary mixing-receptacle, said valve or door being hung so that when the mixing-receptacle is tilted into position for discharging its contents, its discharge-aperture will relatively move away from the suspended valve or door and thereby open to permit the discharge.

34. In a machine for mixing concrete and the like, a rotary, polyhedric mixing-receptacle supported to revolve about a tilting axis, and having oppositely-arranged charging and discharge openings respectively adapted to receive the materials for a batch, and for discharging the mixed-up batch, the charging and discharge openings being formed at opposite corners or vertices formed by the planes of the sides of the receptacle, and the latter being supported to permit its axis of revolution to be tilted into an inclined position so as to depress the discharge-opening and allow the mixed-up batch to discharge through the same.

35. In a mixing-machine for concrete and the like, a polyhedric mixing-receptacle arranged to revolve about a tilting axis extending through diagonally opposite corners or vertices formed by intersecting planes and open at one of such corners to permit the ejection of a mixed-up batch when the axis of rotation is inclined to depress such opening and the mixing-receptacle is revolved about said axis.

36. In a mixing-machine for concrete and the like, a cubiform mixing-receptacle arranged to revolve about a tilting axis extending through diagonally opposite corners and open at one of such corners to permit the ejection of a mixed-up batch when the axis of rotation is inclined to depress such opening and the mixing-receptacle is revolved about said axis.

WILLIAM J. JUDD.

Witnesses:
CHARLES G. PAGE,
OTTILIE C. FREIBERG.